US008346819B2

(12) United States Patent
Do et al.

(10) Patent No.: US 8,346,819 B2
(45) Date of Patent: Jan. 1, 2013

(54) ENHANCED DATA CONVERSION FRAMEWORK

(75) Inventors: Hong-Hai Do, London (GB); Gregor Hackenbroich, Dresden (DE)

(73) Assignee: SAP AG, Walldorf (DE)

(*) Notice: Subject to any disclaimer, the term of this patent is extended or adjusted under 35 U.S.C. 154(b) by 626 days.

(21) Appl. No.: 12/341,463

(22) Filed: Dec. 22, 2008

(65) Prior Publication Data

US 2010/0161666 A1    Jun. 24, 2010

(51) Int. Cl.
*G06F 7/00* (2006.01)
(52) U.S. Cl. ........ 707/809; 707/760; 707/798; 707/803; 707/806
(58) Field of Classification Search .......... 707/760, 707/798, 803, 806, 809
See application file for complete search history.

(56) References Cited

U.S. PATENT DOCUMENTS

| | | | | |
|---|---|---|---|---|
| 6,035,302 | A | * | 3/2000 | Tonouchi ................ 707/760 |
| 7,299,240 | B1 | * | 11/2007 | Crozier ................ 1/1 |
| 2003/0120651 | A1 | * | 6/2003 | Bernstein et al. ........ 707/6 |
| 2005/0149552 | A1 | * | 7/2005 | Chan et al. ............ 707/102 |
| 2005/0256850 | A1 | * | 11/2005 | Ma et al. ............ 707/3 |
| 2007/0203922 | A1 | * | 8/2007 | Thomas ............ 707/100 |

OTHER PUBLICATIONS

Bonifati et al., "HePToX: Marrying XML and Heterogeneity in Your P2P Databases," Proceedings of the 31st VLDB Conference, Trondheim, Norway, 2005.*
Haas et al., "Clio Grows Up: From Research Prototype to Industrial Tool," ACM, 2005.*
iMap: Discovering Complex Semantic Matches between Database Schemas; Jun. 13-18, 2004 (12 pages).
Christian Drumm, Matthias Schmitt and Hong-Hai do; QuickMig—Automatic Schema Matching for Data Migration Projects; Nov. 6-8, 2007 (10 pages).

* cited by examiner

*Primary Examiner* — Cheyne Ly
(74) *Attorney, Agent, or Firm* — Fish & Richardson P.C.

(57) ABSTRACT

An enhanced data conversion framework, in which a data record in each of first and second data sources is populated with manually selected, representative sample data, the first and second data sources using different data storage schemas to store the representative sample data as instance values of instance elements. Parameters for a CONCATENATE function or an EXTRACT function are automatically determined based on a selected succession graph, and non-sample data is converted between the different data storage schemas of the first and second data sources, using the CONCATENATE function or the EXTRACT function.

18 Claims, 17 Drawing Sheets

| Source Element | Sample Instance | Target Element | Sample Instance |
|---|---|---|---|
| FirstName | Allan | FirstName | Allan_Humpf |
| MiddleName | Humpf | | |
| Type | All | | |
| Spec | Hum | | |

| Source Element | Sample Instance | Target Element | Sample Instance |
|---|---|---|---|
| FirstName | Allan | FirstName | AllanHumpf |
| MiddleName | Humpf | | |
| Type | All | | |
| Spec | Hum | | |

Step 5: Validate obtained mapping... _802_

| Mapping Process Step Description | Step 1<br>Start Mapping Project | Step 2<br>Upload Source Data | Step 3<br>Specify Sample Instances | Step 4<br>Create Mapping | Step 5<br>Validate Obtained Mapping | Step 6<br>Execute Data Transformation | Confirm All |

Review automatically obtained matches          ☐ Hide Confirmed Matches _832_

| Source Element<br>/QBCustomer/... _828a_ _808_ | Source Instance | Target Element _828b_<br>/Contacts/... _810_ | Target Instance | Mapping _804_ | Comment _806_ _826_ | Con-firmed |
|---|---|---|---|---|---|---|
| @AccountNumber | MASCHMI01 | /Key/@Account ID* | MASCHMI01 | MOVE | | ☐ |
| @AltPhone | 030-44-13579 | /Business Communication/@Phone | 030-44-13579 | MOVE | | ☐ |
| @Salutation | Mr. | /Contact/@Title | Mr. | MOVE | | ☐ |
| @LastName | Bogan | /Contact/@Last Name | Bogan | MOVE | | ☐ |
| @ContactAddress:Country | CDE | /Relationship Address/@Country | CDE | MOVE | | ☐ |
| @ContactAddress:Addr2 | CStreet2 | /Relationship Address/@Address Line 2 | CStreet2 | MOVE | | ☐ |
| @ContactAddress:Addr3 | CStreet3 | /Relationship Address/@Address Line 3 | CStreet3 | MOVE | | ☐ |
| @ContactAddress:Addr4 | CStreet4 | /Relationship Address/@Address Line 4 | CStreet4 | MOVE | | ☐ |
| @ContactAddress:City | CCity | /Relationship Address/@City | CCity | MOVE | | ☐ |
| @ContactAddress:PostalCode | C0001 | /Relationship Address/@ZIP Code | C0001 | MOVE | | ☑ |
| @FirstName _814_<br>@MiddleName | Allan<br>Humph | /Contact/@First Name | Allan Humph | CONCAT _812_ | DELIMITERS:<br>[][-][] _816_ | ☑ |
| @ContactAddress.Addr1 _820_ | C0004, CStreet | /Relationship Address/@House Number | C0004 | EXTRACT _818_ | EXTRACT:<br>Start: []<br>End: [,] _822_ | |
| @ContactAddress.Addr1 | C0004, CStreet | /Relationship Address/@Street | CStreet | EXTRACT | EXTRACT:<br>Start: [,]<br>End: [] | ☑ |

_824_ [< Previous Step] [Add Match] [Remove Match] [Edit Match] [Save Matches] [Next Step >] _830_

Mapping Process Step Description: Step 1 Start Mapping Project | Step 2 Upload Source Data | Step 3 Specify Sample Instances | Step 4 Create Mapping | Step 5 Validate Obtained Mapping | Step 6 Execute Data Transformation 1100
1102

Source data properties
File name: QBCustomer.xls   Column definition: 1 Row
File type: Excel File   Description:   newSource QBCustomer ✓

Select source record to be displayed [1] of 34   Set as sample record? ✓   (Current sample instance is set to 1)

1104
1106

| Schema Element | Description | Instance Data |
|---|---|---|
| ▼ ☐ QBCustomer | | |
| ☐ TimeCreated | | 9/25/2007 5:24:18 PM |
| ☐ TimeModified | | 9/25/2007 5:24:18 PM |
| ☐ EditSequence | | 1071212342 |
| ☐ Name | | |
| ☐ FullName | | Allan Middle Bogan |
| ☐ IsActive | | True |
| ☐ ParentRef:Fullname | | |
| ☐ Sublevel | | 0.0 |
| ☐ CompanyName | | Maschmi |
| ☐ Salutation | | Mr. |
| ☐ FirstName | | Allan |
| ☐ MiddleName | | Humph |
| ☐ LastName | | Bogan |
| ☐ Suffix | | |
| ☐ MainAddress:Addr1 | | Street 00004 |
| ☐ MainAddress:Addr2 | | Street2 |
| ☐ MainAddress:Addr3 | | Street3 |

< Previous Step    Upload File    Next Step >

| | | | | | |
|---|---|---|---|---|---|
| Mapping Process Step Description | Step 1 Start Mapping Project | Step 2 Upload Source Data | Step 3 Specify Sample Instances | Step 4 Create Mapping | Step 5 Validate Obtained Mapping | Step 6 Execute Data Transformation | newMapping-General ?

Mapping Name: newMapping-General

Source Structure: QBCustomer
Target Structure: General

☐ Confirm All
☐ Hide Confirmed Matches

| Source Element  1408 | Source Instance | Target Element  1410 | Target Instance | Mapping  1404 | Comment  1406 | Confirmed |
|---|---|---|---|---|---|---|
| /QBCustomer/DeliverMethod /QBCustomer/FirstName /QBCustomer/LastName | EXW Wiesloch Allan Bogan | /General/Account/Delivery Block /General/Account Person/FirstName /General/Account Person/LastName /General/Key/Account ID* /General/Account/New Corporate | EXW Wiesloch Allan Bogan | MOVE MOVE MOVE | | ☑ ☑ ☑ ☐ ☐ |

[< Previous Step]　　[Add Match]　[Remove Match]　[Edit Match]　　[Next Step >]

Mapping Process Step Description: Step 1 Start Mapping Project | Step 2 Upload Source Data | Step 3 Specify Sample Instances | Step 4 Create Mapping | Step 5 Validate Obtained Mapping | Step 6 Execute Data Transformation

1200

1202

Please use your selected source sample records to ... specify instance values for target elements

1204

1206

QBCustomer

| Schema Element | Instance Data |
|---|---|
| ▼ ⬜QBCustomer | |
| ⬜TimeCreated | 9/25/2007 5:24:18 PM |
| ⬜TimeModified | 9/25/2007 5:24:18 PM |
| ⬜EditSequence | 1071212342 |
| ⬜Name | |
| ⬜FullName | Allan Middle Bogan |
| ⬜IsActive | True |
| ⬜ParentRef:Fullname | |
| ⬜Sublevel | 0.0 |
| ⬜CompanyName | Maschmi |
| ⬜Salutation | Mr. |
| ⬜FirstName | Allan |
| ⬜MiddleName | Humph |
| ⬜LastName | Bogan |
| ⬜Suffix | |
| ⬜MainAddress:Addr1 | Street 00004 |
| ⬜MainAddress:Addr2 | Street2 |
| ⬜MainAddress:Addr3 | Street3 |
| ⬜MainAddress:Addr4 | Street4 |
| ⬜MainAddress:City | City |
| ⬜MainAddress:State | State |

General | Addresses | Collaboration | Contact Hours | Contacts | Sales Data

Schema Element | Sample Instance

▼ ⬜General
  ▶ ⬜Key
    ⬜Account ID *
  ▼ ⬜Account
    ⬜New Corporate or Private Account *
    ⬜Contact Permission
    ⬜Order Block
    ⬜Delivery Block
    ⬜Invoice Block
    ⬜Prospect
  ▶ ⬜Account Organization
    ⬜D-U-N-S
    ⬜Account Name
    ⬜Additional Name
  ▼ ⬜Account Person
    ⬜Title
    ⬜Academic Title
    ⬜First Name
    ⬜Last Name
  ▼ ⬜Details Organization
    ⬜Legal Form < Previous Step | Check Completeness | Check Overlapping | Clear Values | Get Premapped Values | Next Step >

| Cardi-nality 1710 | Source 1704 | | Target 1704 | | Mapping: Source -> Target 1708 | |
|---|---|---|---|---|---|---|
| | Attribute(s) | Instance(s) | Attribute(s) | Instance(s) | Function | Delimiter(s) |
| 1:1 1712 | Name | "Allan" | CustomerName | "Allan" | Copy 1714 | None |
| 1:1 1716 | Name | "<b>Allan<b>" | CustomerName | "Allan" | CustomerName=Extract(Name, from delimiter to delimiter) 1718 | "<b>", "<b>" |
| N:1 1720 | FirstName, LastName | "Allan", "Humpf" | CustomerName | "Humpf, Allan" | CustomerName = Concat(LastName, delimiter, FirstName) 1722 | ", " |
| 1:N 1724 | StreetAddress | "123 Priory Avenue" | HouseNumber, StreetName | "123", "Avenue" | HouseNumber =Extract(StreetAddress, from begin to delimiter), StreetName=Extract(StreetAddr, from delimiter to end) 1726 | " " |
| N:M 1728 | CountryCode, Phone | "0049", "351-222222" | Predial, Telefone | "0049-351", "0049-351-222222" | Predial=Concat(ContryCode, delimiter, Extract(Phone, from begin to delimiter)) Telephone=Concat(ContryCode, Phone) 1730 | "-" |

FIG. 17

ENHANCED DATA CONVERSION FRAMEWORK

FIELD

The present disclosure generally relates to data conversion.

BACKGROUND

In a data conversion or migration, data records are converted from one format to another. For example, databases used in one version of a software application may need to be converted to a new format in order to function properly when using an upgraded version of the software application.

SUMMARY

According to one general implementation, a record of sample data from a first data system is entered by a user, manually or automatically, as a record into a second data system which uses a different data format than the first data system. Correspondences between the data records are machine-analyzed, so as to automatically derive conversion functions that convert data between the different data formats, with little or no user intervention.

According to another general implementation, a computer-implemented process includes populating a data record in each of first and second data sources with manually selected, representative sample data, the first and second data sources using different data storage schemas to store the representative sample data as instance values of instance elements, selecting an instance value of the data record of the first data source, and selecting instance elements of the data record of the second data source whose associated instance values form a substring of the selected instance value of the data record of the first data source. The process also includes generating one or more succession graphs using the selected instance elements of the data record of the second data source, according to a succession defined by the selected instance value of the data record of the first data source, and selecting a succession graph whose combined instance values, when traced from root node to leaf node, matches the selected instance value of the data record of the first data source. Furthermore, the process includes automatically determining parameters for a CONCATENATE function or an EXTRACT function based on the selected succession graph, and converting non-sample data between the different data storage schemas of the first and second data sources, using the CONCATENATE function or the EXTRACT function.

Implementations may include one or more of the following features. For instance, the first and second data sources may represent source and target data sources, respectively, or target and source data source, respectively. Converting the non-sample data between the first and second data sources may further include executing the EXTRACT function or the CONCATENATE function. Populating the data record in each of the first and second data sources may further include selecting a sample data record of the first data source to supply the representative sample data, and manually populating the data record of the second data source with data specified by the selected sample data record of the first data source.

In further examples, the process may also include converting a case of the selected instance value of the data record of the first data source, or identifying, as a parameter of the CONCATENATE function, a delimiting string of the selected instance value of the data record of the first data source. The process may further include removing one or more delimiting strings from the selected instance value of the data record of the first data source. Each delimiting string may be any combination of one or more of a space, a dot, a dash, an underscore, a comma, a semicolon, a colon, or a quotation mark. The process may include processing a manual selection of the succession graph whose combined instance value matches the selected instance value of the data record of the first data source, when more than one succession graph exhibits combined instance values which match the selected instance value of the data record of the first data source.

In another example, the CONCATENATE function may be expressed as shown below, in Equation (1):

$$\text{FirstDataSource.InstanceElement} = \text{Concatenate}(\text{SecondDataSource.FirstInstanceElement}, \text{DelimitingString}, \text{SecondDataSource.SecondInstanceElement}). \quad (1)$$

In the example CONCATENATE function, FirstDataSource.InstanceElement may represent the instance value of the data record of the first data source, SecondDataSource.FirstInstanceElement may represent an instance value of the root of the selected succession graph, DelimitingString may represent a delimiting string associated with the instance value of the data record of the first data source, and SecondDataSource.SecondInstanceElement may represent an instance value of the leaf node of the selected succession graph.

In another example, the EXTRACT function is expressed as shown below, in Equations (2) and (3):

$$\text{SecondDataSource.FirstInstanceElement} = \text{extract}(\text{FirstDataSource.InstanceElement}, S_{\text{Start}}=\text{BeginningOfString}, E_{\text{nd}}=\text{DelimitingString}) \quad (2)$$

$$\text{SecondDataSource.SecondInstanceElement} = \text{extract}(\text{FirstDataSource.InstanceElement}, S_{\text{Start}}=\text{DelimitingString}, E_{\text{nd}}=\text{EndOfString}). \quad (3)$$

In the example EXTRACT function, FirstDataSource.InstanceElement may represent the instance value of the data record of the first data source, SecondDataSource.FirstInstanceElement may represent an instance value of the root of the selected succession graph, DelimitingString may represent a delimiting string (e.g., one or more characters) associated with the instance value of the data record of the first data source, SecondDataSource.SecondInstanceElement may represent an instance value of the leaf node of the selected succession graph, BeginningOfString may represent a beginning of the string defined by the instance value of the data record of the first data source, and EndOfString may represent an end of the string defined by the instance value of the data record of the first data source.

In other examples, the process further includes outputting the parameters of the CONCATENATE function or the parameters of the EXTRACT function, and receiving a user input confirming that the parameters are correct. The data storage schema of the first data source may store first and last name representative sample data as a single instance element, and the data storage schema of the second data source may store the first and last name representative sample data as a first name instance element and different, second name instance element.

In further examples, the data storage schema of the first data source may store street number and street name representative sample data as a single instance element, and the data storage schema of the second data source may store the street number and street name representative sample data as a street number instance element and a different, street name instance element. Automatically determining the parameters for a CONCATENATE function or an EXTRACT function based on the selected succession graph may include automatically determining parameters for a CONCATENATE function and parameters for an EXTRACT function, and converting the non-sample data between the different data storage schemas of the first and second data sources, using the CONCATENATE function or the EXTRACT function may further include executing the CONCATENATE function and the EXTRACT function.

According to another general implementation, a system includes one or more computers, and a computer-readable medium coupled to the one or more computers having instructions stored thereon. When executed by the one or more computers, the instructions cause the one or more computers to perform operations including populating a data record in each of first and second data sources with manually selected, representative sample data, the first and second data sources using different data storage schemas to store the representative sample data as instance values of instance elements, selecting an instance value of the data record of the first data source, and selecting instance elements of the data record of the second data source whose associated instance values form a substring of the selected instance value of the data record of the first data source. The operations also include generating one or more succession graphs using the selected instance elements of the data record of the second data source, according to a succession defined by the selected instance value of the data record of the first data source, selecting a succession graph whose combined instance values, when traced from root node to leaf node, matches the selected instance value of the data record of the first data source, automatically determining parameters for a CONCATENATE function or an EXTRACT function based on the selected succession graph, and converting non-sample data between the different data storage schemas of the first and second data sources, using the CONCATENATE function or the EXTRACT function.

According to another general implementation, a computer-readable medium encoded with a computer program comprising instructions that, when executed, operate to cause a computer to perform operations including populating a data record in each of first and second data sources with manually selected, representative sample data, the first and second data sources using different data storage schemas to store the representative sample data as instance values of instance elements, selecting an instance value of the data record of the first data source, selecting instance elements of the data record of the second data source whose associated instance values form a substring of the selected instance value of the data record of the first data source, and generating one or more succession graphs using the selected instance elements of the data record of the second data source, according to a succession defined by the selected instance value of the data record of the first data source. The operations also include selecting a succession graph whose combined instance values, when traced from root node to leaf node, matches the selected instance value of the data record of the first data source, automatically determining parameters for a CONCATENATE function or an EXTRACT function based on the selected succession graph, and converting non-sample data between the different data storage schemas of the first and second data sources, using the CONCATENATE function or the EXTRACT function. The first and second data sources may represent source and target data sources, collectively.

The details of one or more implementations are set forth in the accompanying drawings and the description, below. Other features and advantages of the disclosure will be apparent from the description and drawings, and from the claims.

BRIEF DESCRIPTION OF THE DRAWINGS

FIGS. 5 through 9 show an example sequence of data fields that are used during a conversion process.

FIGS. 10 through 16 show an example sequence of application screens that may be used to define and execute conversion functions.

FIG. 17 is a comparison chart comparing example values for different cardinalities used for mapping strings and substrings for conversion.

DETAILED DESCRIPTION

According to one example of the enhanced framework described herein, a record of sample data from a first data system is manually or automatically entered by a user as a record into a second data system which uses a different data format than the first data system. Correspondences between the data records may be machine-analyzed, so as to automatically derive conversion functions that convert data between the different data formats, with little or no user intervention.

Thus, an approach is described for automatically deriving executable conversion functions which may be utilized to transform data between different schemas. The approach utilizes sample instance data provided or identified by the user for both the source and target schemas, and applies string comparison techniques to identify complex data conversion functions, in particular CONCATENATE and EXTRACT functions. Some fields in the original (or source) database, data file or schema may be broken into different parts and/or in a different order in the target version, which may represent, for instance, an upgraded database. Some fields (or columns in an RDBMS table) may be absent from either the source or target data records (or rows in the RDBMS table).

Figure 1:
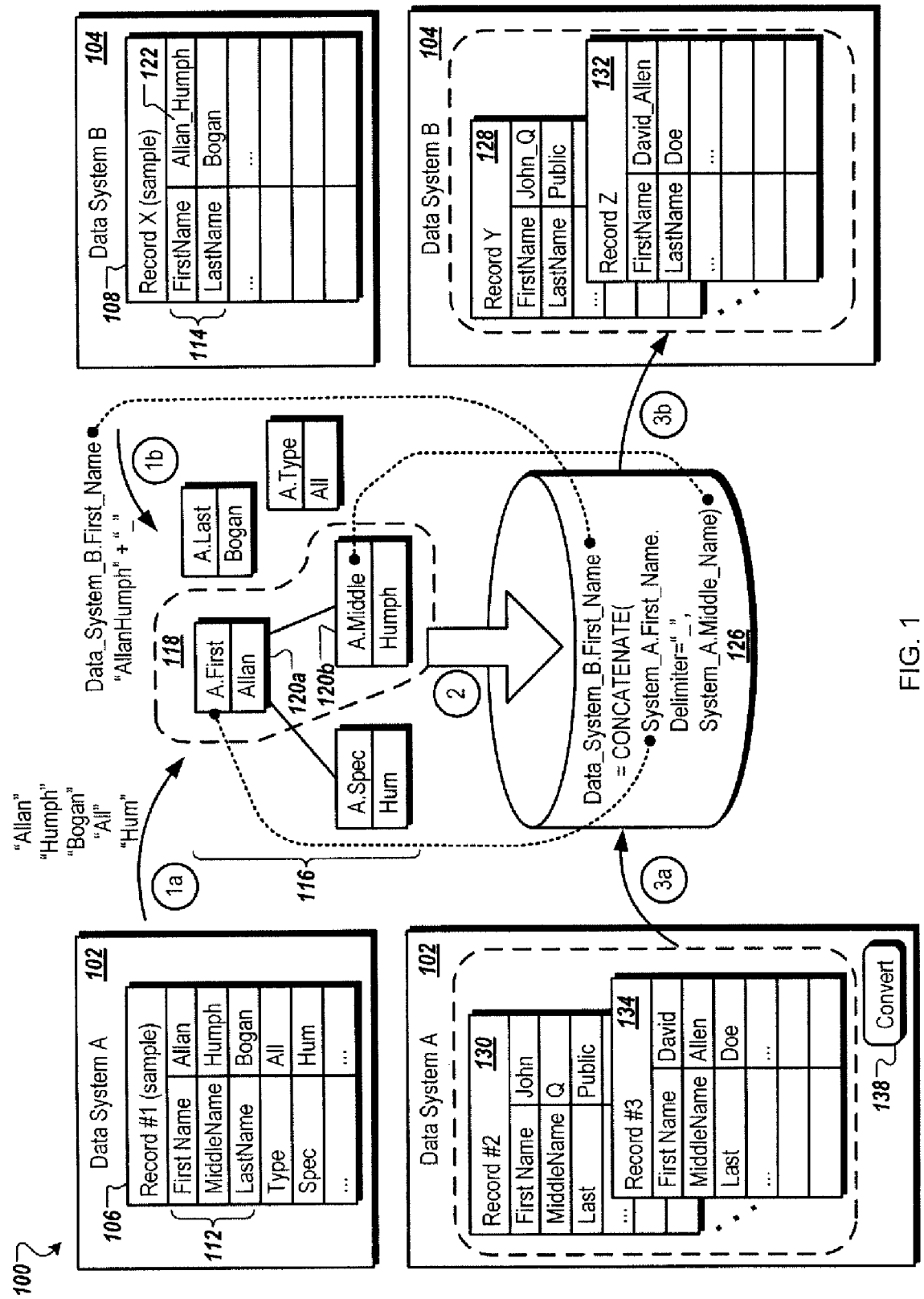
FIG. 1 is a block diagram of an exemplary system that implements concatenation of data elements within automatic identification of complex data conversion functions using sample data.

FIG. 1 is a block diagram of an exemplary system 100 that implements concatenation of data elements within automatic identification of complex data conversion functions using sample data. The system 100 facilitates data conversion from a data system A 102 to a data system B 104. For example, the data systems 102 and 104 may both be similar customer-related systems, such as computer systems at an Internet bookstore or a paint supply store, or they may represent very different systems, such as a government motor vehicle database and a government criminal database.

Each of the data systems 102 and 104 may have databases, each in a different format, of customer-related information, such as customer names, addresses, phone numbers, purchase records, credit card numbers, account numbers, credit limits, and so on. Over time, additional fields may be needed in the database or data file, often requiring creation of a new format of the data. As a result, while an Internet bookstore, for example, may initially have the data system A 102 for storing information for book-buying customers in one format, a new format may eventually exist, such as in the data system B 104. To convert data from one format to another, the system 100 may use information, such as sample data, from both the systems 102 and 104. Such sample data may make it possible to at least partially automate and simplify data conversion from the old format to the new format.

In some implementations, the system 100 may be used to convert data from distinctly different systems. For example, the data system A 102 may be a customer-based system, and the data system B 104 may be a personal contact system. The two systems 102 and 104 may have databases or data files with several fields in common, such as contact names, addresses, phone numbers, etc., in addition to having several unique fields not included in the other system. As such, the substance of the fields may be common to both databases, but the format of the specific fields may differ. In this case, the system 100 may be used to populate data fields from one system to another. For instance, the system 100 may automatically "fill in" or complete data fields in the data system B 104 (e.g., a personal contact system) with similar fields from the data system A 102.

Conversions performed by the system 100 may make use of information in sample records. For example, data system A 102 includes a sample record_1 106, and the data system B 104 includes a sample record_X 108. Each of the records 106 and 108 includes fields with a same or similar intended substance. For example, the sample record_1 106 includes three name fields 112 (e.g., "First Name," "Middle Name" and "Last Name"). By comparison, the sample record_X 108 includes two name fields 114 (e.g., "FirstName" and "LastName," where the value of "FirstName" is intended to include the concatenated values of "First Name" and "Middle Name"). The sets of values of the fields 110 and 112 both represent a person named "Allan Humph Bogan," but each makes the representation differently. Both records 106 and 108 store the person's last name in a single last name field (e.g., "Last Name" and "LastName"). However, while the sample record_1 106 stores the person's first name "Allan" and middle name "Humph" in separate fields (e.g., "First Name" and "Middle Name"), the information is combined in a single field (e.g., FirstName) in the sample record X 108.

In a high-level example sequence of events of a conversion process performed using the system 100, a user may first select a representative sample data record (e.g., sample record_1 106) in the source system (e.g., data system A 102). The user may also specify the corresponding sample data record (e.g., sample record_X 108) in the target system (e.g., data system B 104).

Using the sample records 106 (operation ①a ) and 108 (operation ①b), the system may produce several nodes in a succession graph 116. Each of the nodes in the succession graph 116 may represent a particular one of the fields in the sample record_1 106 as it related to the values of the sample record_X 108. Lines connecting nodes indicate relationships between values in the records 106 and 108. For example, the branch 118 of the succession graph 116 shows a succession relationship between a first name node 120a (e.g., "Allan" in the First_Name field) and a middle name node 120b, with a line connecting the nodes 120a and 120b. This represents the fact that the FirstName field 122 with a value of "Allan_Humph" is derived from the "Allan" and "Humph" values of the nodes 120a and 120b, respectively.

In operation ②, the relationships represented by the succession graph 116 are stored in a data store 126. The relationships may be stored as CONCATENATE, EXTRACT or other functions. For example, the function representing the branch 118 is a CONCATENATE function:

Data_System_*B*.First_Name=CONCATENATE(System_ *A*.First_Name, Delimiter="_",System_ *A*.Middle_Name) (4)

By this function, a concatenation occurs to create the First-Name field in records of the data system B 104. The values used in the concatenation are the "FirstName" field of a record in the data system A 102, followed by an underline delimiter, followed by the "MiddleName" field of a record in the data system A 102. This function may be produced, for example, by the system 100 examining values in the sample records 102 and 104. This and other functions stored in the data store 126 may then be used to automatically convert records from the data system A 102 to the data system B 104.

Finally, at a later time in the example conversion sequence after the conversion functions have been derived, the remaining data records in the data system A 102 are used (operation ③a) to produce (operation ③b) data records in the data system B 104. The conversion process uses functions that are stored in the data store 126. As a result, a record_Y 128 may be created by converting the data in a record_2 130, and a record_Z 132 may be created from a record_3 134. For example, once the data store 126 is populated with functions derived from sample records, the conversion process may be initiated using a convert button 138 or other control.

Figure 2:
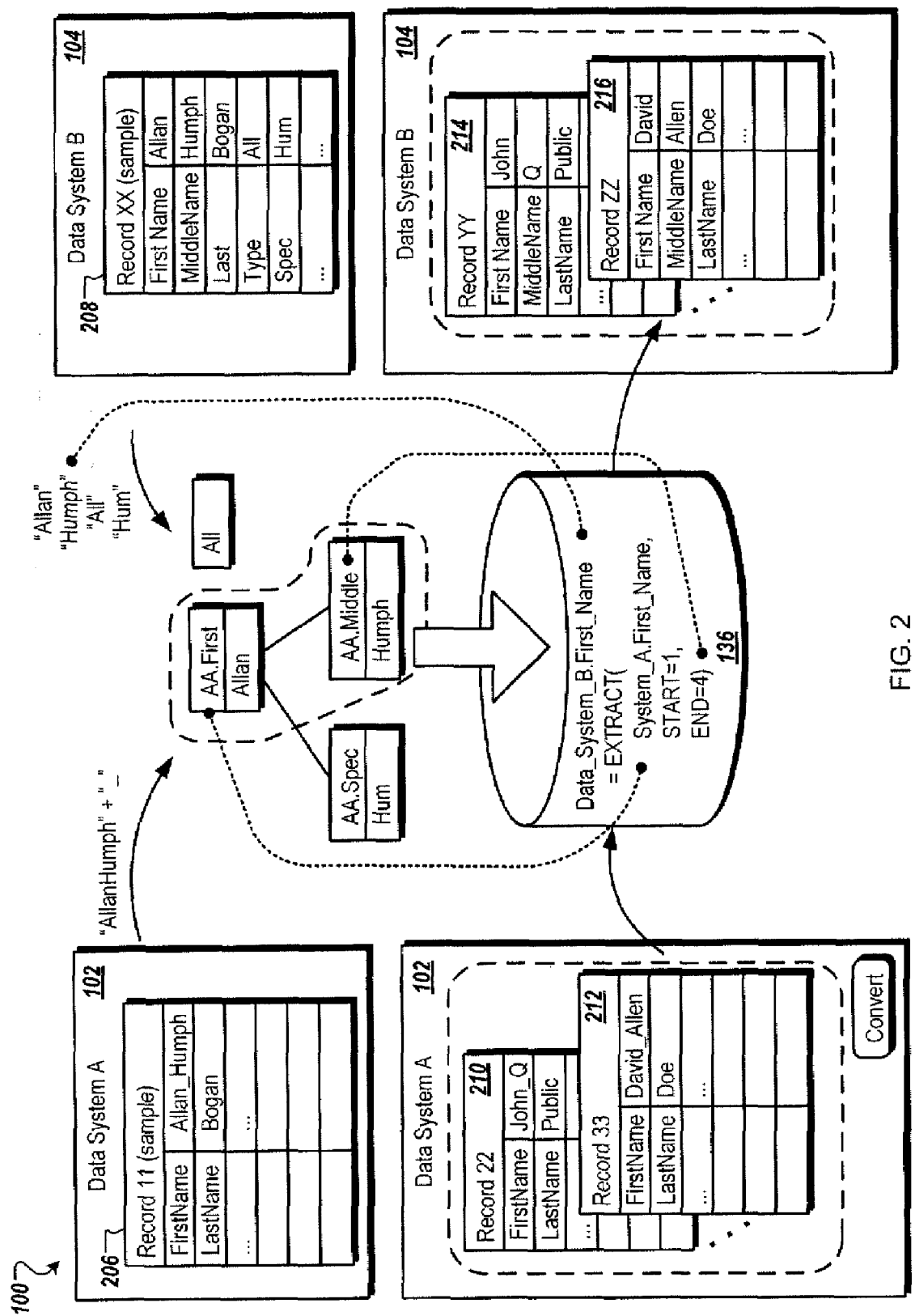
FIG. 2 is a block diagram of the system implementing an extraction of data elements for conversion functions using sample data.

FIG. 2 is a block diagram of the system 100 implementing an extract function of data elements for conversion functions using sample data. The extract function depicted in FIG. 2 is similar to the concatenation function depicted in FIG. 1, except that the extract function in FIG. 2 is used to automatically extract substrings of larger strings. Here, the data system A 102 includes a sample record_11 206 that stores names in the format used by the data system A 102. The data system B 104 includes a sample record_XX 208 storing names in the format used by the data system B 104.

For example, the sample record_11 206 includes First-Name ("e.g., "Allan_Humph") and LastName fields. The same first and middle names ("e.g., "Allan_Humph") are represented in the sample record_XX 208 in two fields, a first name field containing "Allan" and a middle name field containing "Humph."

The function stored in the data store 126 of FIG. 2 is an extract function:

Data_System_*B*.First_Name=EXTRACT(System_ *A*.First_Name, START=1, END=4) (5)

The EXTRACT function here creates the First_Name field in records of the data system B 104, using an EXTRACT operation. The values used in the function are the "FirstName" field of a record in the data system A 102, followed by a start position (e.g., "1" or the first character of the name) and an end value (e.g., "4", meaning to stop extracting the name "John" after the fourth letter, or "n"). In some implementations, the numeric value for the end value may be a delimiter (or delimiting string), such as an underscore.

In general, delimiting strings may include any combination of one or more delimiter characters, and a particular instance element may include zero or more delimiting string. For example, in a phone number having the format "(999) 888-7777", the delimiting string between 999 and 888 is two characters: a right parenthesis and a space. Also, characters that are normally considered delimiters (e.g., a space character) can appear naturally within strings (e.g., the last name "Van Dyke"). To account for this case in which delimiting characters can occur in data, the number of occurrences of the delimiting strings can be counted. For example, the EXTRACT function can utilize the second or last occurrence of the delimiting string, using rules, for example, that disambiguate between delimiters and non-delimiters of the same character. Further, based on the identified positions and delimiting characters, regular expressions can be generated for pattern matching and extraction (implementation).

Using the EXTRACT function stored in the data store 126, records in the data system A 102 may be converted into records and stored in the data system B 104. In particular, the EXTRACT function may "extract" the first name portion (e.g., "John" or David") from the FirstName records in record_22 210 and record_33 212, respectively, to create the First Name field in each of the record_YY 214 and record_ZZ 216, respectively.

Figure 3:
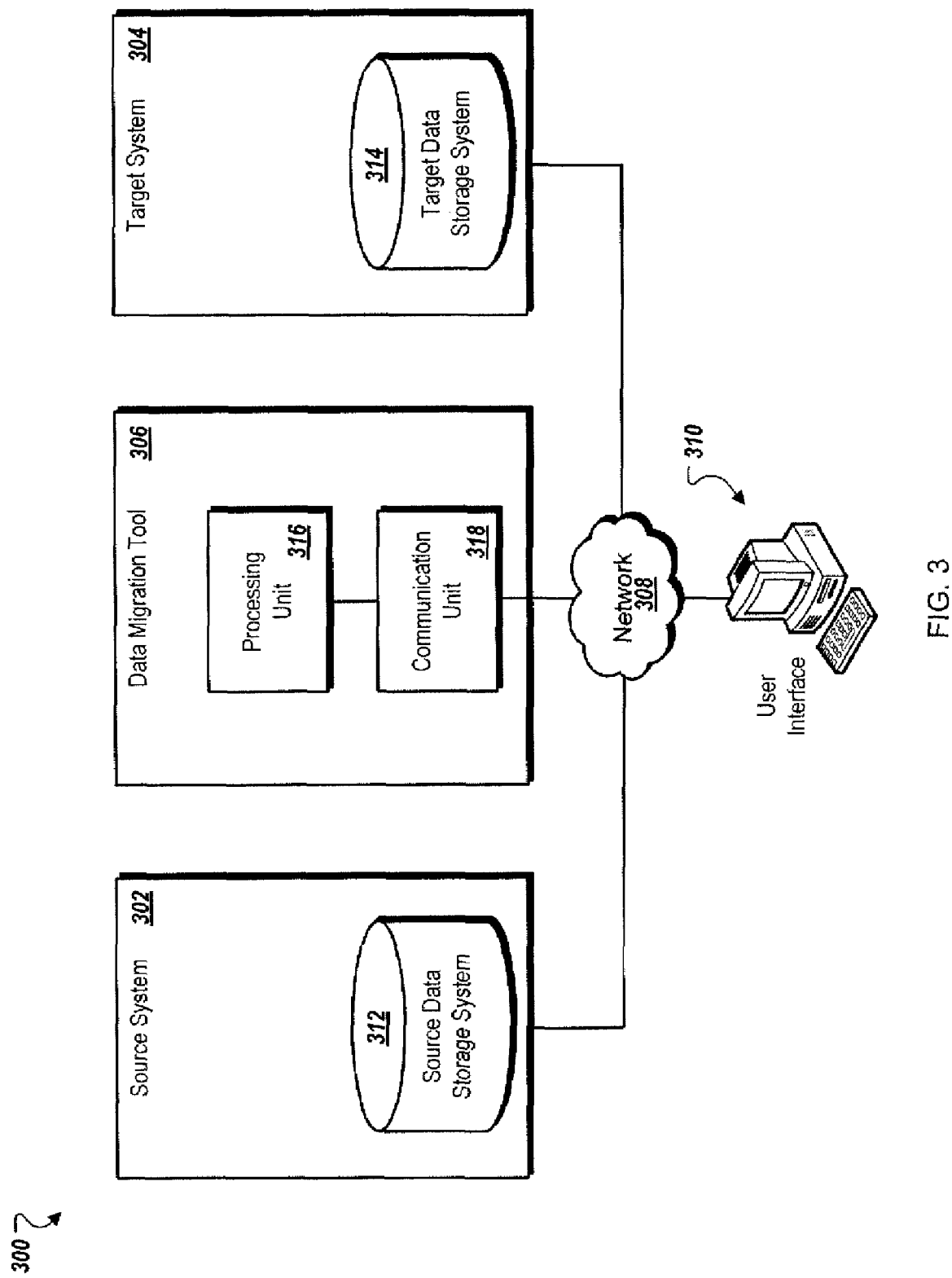
FIG. 3 is a block diagram of an exemplary device that implements automatic identification of complex data conversion functions using sample data.

FIG. 3 is a block diagram of an exemplary device 300 that implements automatic identification of complex data conversion functions using sample data. For example, the device 300 may convert data from the format or schema used by a source system 302 to the format or schema used by a target system 304. The systems 302 and 304 may correspond to the systems 102 and 104 of FIGS. 1 and 2, or they may be different systems. In some implementations, the device 300 may be used to convert data among more than two systems, such as a conversion process that uses a single source system 302 (e.g., a central processing facility of a bank) and several target systems 304 (e.g., several branches of the bank). In this case, the conversion process may create converted records in several source systems simultaneously.

The source system 302 includes a source data storage system 312 that stores source data in the format or schema used by the source system 302. For example, the source data storage system 312 may store first and middle names in a combined field, such as storing "Allan_Humph" in the FirstName field of the record_1 106. The target system 304 includes a target data storage system 314 that stores source data in the format or schema used by the source system 304. For example, the source data storage system 314 may store first and middle names in separate fields, such as storing "Allan" in a FirstName field and "Humph" in a MiddleName field in the record_X 108.

The device 300 includes a data migration tool 306 that performs the actual processing of the conversion of data from the source system 302 to the target system 304. The conversion may occur over a network 308, such as a LAN, a WAN or the Internet. The conversion process may be initiated and controlled by a user employing a user interface (e.g., data base conversion software executing on a personal computer, laptop, etc.) that is communicatively coupled to the systems 102 and 104 and the data migration tool 306 via the network 308.

The data migration tool 306 includes a processing unit 316 and a communication unit 318. The processing unit 316 may contain and use the functions needed for converting data records, such as the CONCATENATE and EXTRACT functions described with regard to FIGS. 1 and 2. The communication unit 318 may handle inputs received via the network 308 from the user 310, as well as communicating with the source data storage system 312 and the target data storage system 314.

In a sample conversion scenario using the device 300 to convert data, a user employing the user interface 310 may identify sample records in the systems 302 and 304 that represent the same general information or record (e.g., a customer named "David Allan Humph", a sales order "143776/YZ", etc.), only the data is stored differently in each system. For example, while "David Allen" may be stored in a first name field in the source system 302, and same first and middle names "David" and "Allen" may be stored in separate first and middle name fields in the target system 304.

Figure 4:
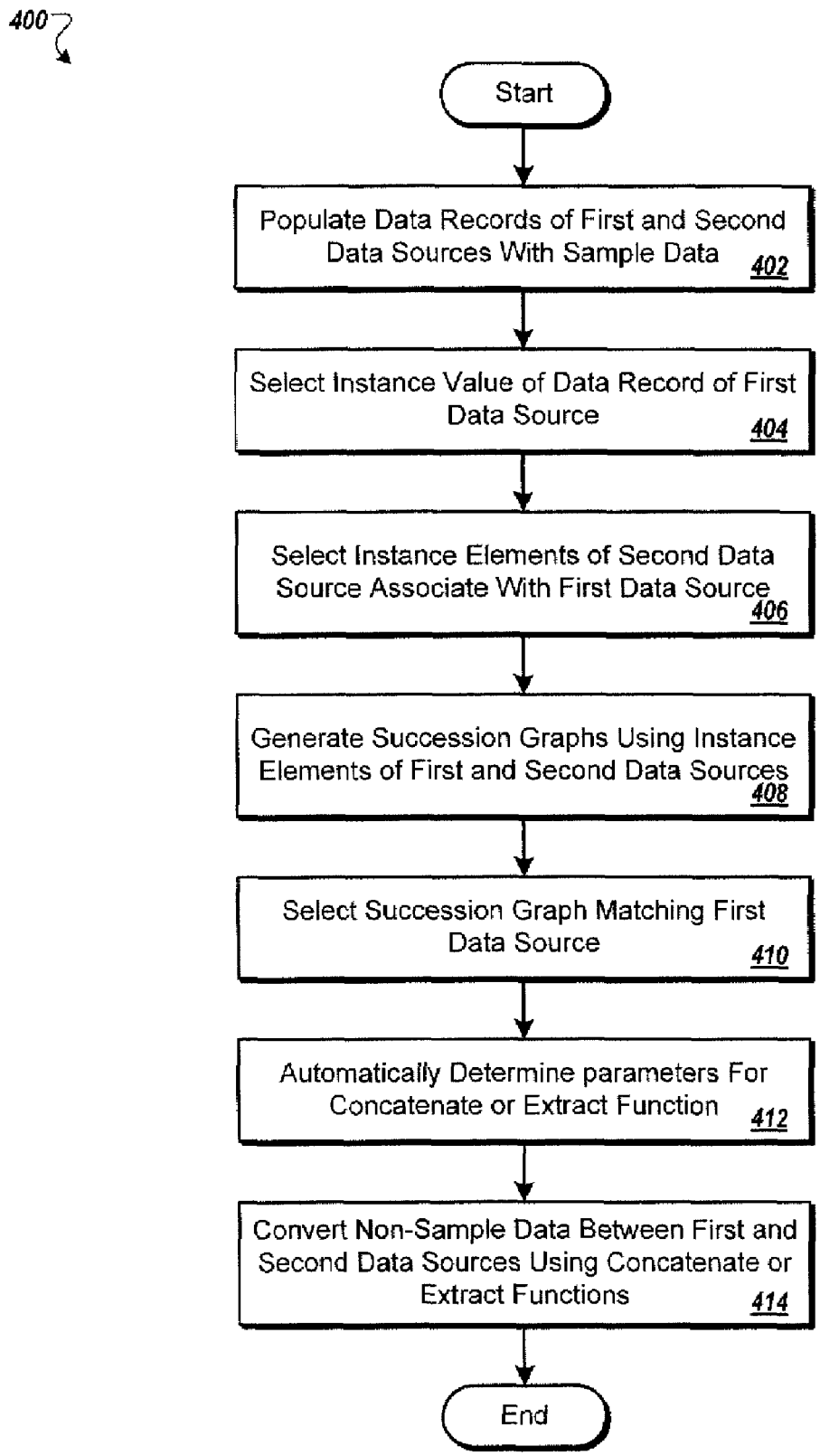
FIG. 4 is a flowchart illustrating an example process for providing automatic identification of complex data conversion functions using sample data.

FIG. 4 is a flowchart illustrating an example process 400 for providing automatic identification of complex data conversion functions using sample data. For example, the process 400 may identify conversion functions, such as the CONCATENATE function produced using the sample records 106 and 108 and/or the EXTRACT function produced using the sample records 206 and 208.

A data record is populated in each of first and second data sources with manually selected, representative sample data (operation 402). The first and second data sources use different data storage schemas to store the representative sample data as instance values of instance elements. For example, the data record chosen may be the record_1 106 representing "David_Allen Humph." The choice may be made, for example, by a user employing the user interface 310. The user may make this choice, for example, because the record_1 106 is known to be a good sample record to use as a model for converting data from the schema used by the system 302 to the schema used by the target system 304.

In addition to, or instead of manually populating the first and second data sources with the representative sample data, other approaches may be used. For instance, the data record of the second data source may be automatically populated with a sample data record of the first data source using automatic schema matching. Additionally, the data record of the second data source may be populated with data specified by the selected sample data record of the first data source using manual input supported by an auto-complete functionality (so called "semi-automatic population").

An instance value of the data record of the first data source is selected (operation 404). For example, the instance value chosen may be the First Name "Allen" in the record_1 106. The choice may be made automatically, for example, by the computer-implemented software that performs the conversion process associated with the process 400.

Instance elements of the data record of the second data source are selected whose associated instance values form a substring of the selected instance value of the data record of the first data source (operation 406). For example, based on the selection of the FirstName field containing "Allan_Humph Bogan" in the sample record 106, the system may automatically select the corresponding data record.

One or more succession graphs are generated using the selected instance elements of the data record of the second data source, according to a succession graph defined by the selected instance value of the data record of the first data source (operation 408). For example, using the sample records 106 and 108, the succession graph 116 may be generated.

A succession graph is selected whose combined instance values, when traced from root node to leaf node, matches the selected instance value of the data record of the first data source (operation 410). For example, from the selection graph 116, the branch 118 is selected.

Parameters are automatically determined for a CONCATENATE function or an EXTRACT function based on the selected succession graph (operation 412). For example, using the information in the branch 118, a CONCATENATE function may be produced and stored in the data store 126, as shown in operation ② of FIG. 1.

In one example, the CONCATENATE function may be expressed as shown below in Equation (1):

$$\text{FirstDataSource.InstanceElement} = \text{CONCATENATE}(\text{SecondDataSource.FirstInstanceElement}, \text{DelimitingString}, \text{SecondDataSource.SecondInstanceElement}). \quad (1)$$

In the example CONCATENATE function, FirstDataSource.InstanceElement may represent the instance value of the data record of the first data source, SecondDataSource.FirstInstanceElement may represent an instance value of the root of the selected succession graph, DelimitingString may represent a delimiting string associated with the instance value of the data record of the first data source, and SecondDataSource.SecondInstanceElement may represent an instance value of the leaf node of the selected succession graph.

In another example, the EXTRACT function is expressed as shown below in Equations (2) and (3):

$$\text{SecondDataSource.FirstInstanceElement} = \text{EXTRACT}(\text{FirstDataSource.InstanceElement}, \text{START=BeginningOfString}, \text{END=DelimitingString}), \text{ and} \quad (2)$$

$$\text{SecondDataSource.SecondInstanceElement} = \text{EXTRACT}(\text{FirstDataSource.InstanceElement}, \text{START=DelimitingString}, \text{END=EndOfString}). \quad (3)$$

In the example EXTRACT function, FirstDataSource.InstanceElement may represent the instance value of the data record of the first data source, SecondDataSource.FirstInstanceElement may represent an instance value of the root of the selected succession graph, DelimitingString may represent a delimiting string (e.g., one or more characters) associated with the instance value of the data record of the first data source, SecondDataSource.SecondInstanceElement may represent an instance value of the leaf node of the selected succession graph, BeginningOfString may represent a beginning of the string defined by the instance value of the data record of the first data source, and EndOfString may represent an end of the string defined by the instance value of the data record of the first data source.

In addition to or instead of referencing the delimiting string, the CONCATENATE function or the EXTRACT function may also reference absolute position within the instance element.

For example, another example EXTRACT function which extracts a string of text from an instance element between a first absolute position (such as an Nth character, or a beginning of the element) and a second absolute position (such as an N+1th character, or an end of the element) may be expressed as shown below in Equation (6):

$$\text{SecondDataSource.FirstOrSecondInstanceElement} = \text{EXTRACT}(\text{FirstDataSource.InstanceElement}, \text{START=AbsolutePosition\_1}, \text{END=AbsolutePosition\_2}) \quad (6)$$

Another example EXTRACT function which extracts a string of text from an instance element between an absolute position and the beginning, middle or end of the delimiting string may be expressed as shown below in Equation (7):

$$\text{SecondDataSource.FirstOrSecondInstanceElement} = \text{EXTRACT}(\text{FirstDataSource.InstanceElement}, \text{START=AbsolutePosition}, \text{END=DelimitingString}) \quad (7)$$

An additional example EXTRACT function which extracts a string of text from an instance element between the beginning, middle or end of the delimiting string and an absolute position may be expressed as shown below in Equation (8):

$$\text{SecondDataSource.FirstOrSecondInstanceElement} = \text{EXTRACT}(\text{FirstDataSource.InstanceElement}, \text{START=DelimitingString}, \text{END=AbsolutePosition}), \text{ and} \quad (8)$$

A further example EXTRACT function which extracts a string of text from an instance element between the beginning, middle or end of a first delimiting string and the beginning, middle or end of a second delimiting string may be expressed as shown below in Equation (9):

$$\text{SecondDataSource.FirstOrSecondInstanceElement} = \text{EXTRACT}(\text{FirstDataSource.InstanceElement}, \text{START=DelimitingString}, \text{END=DelimitingString}), \quad (9)$$

Non-sample data is converted between the different data storage schemas of the first and second data sources, using the CONCATENATE function or the EXTRACT function (operation 414). For example, the CONCATENATE function stored in the data store 126 is used to convert data records between the systems 102 and 104. Specifically, the record_Y 128 may be created by converting the data record_2 130, and the record_Z 132 may be created from the record_3 134.

In some implementations, two sets of sample records may be used. In this way, record positions of fields determined by examining the first set of source and target sample records may be double-checked against a second set of source and target sample records. This may provide the advantage of reducing the amount of manual inputs needed to complete the mapping of data from the source to the target.

Figure 5:
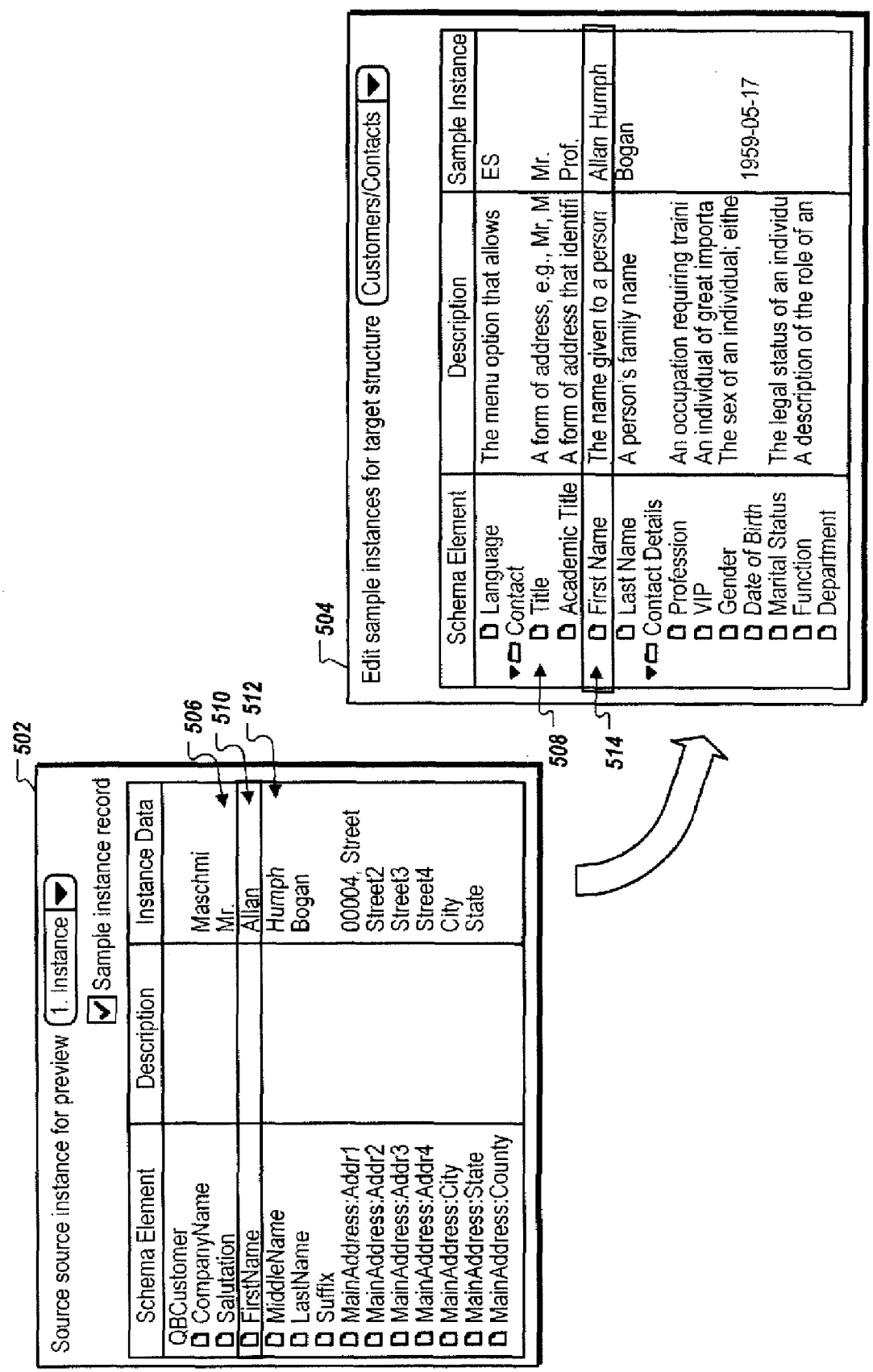

FIGS. 5 through 9 show an example sequence of data fields are used during a conversion process. Referring to FIG. 5, the user may select a representative sample source instance record 502 from the source system, as well as the corresponding sample target structure 504 in the target schema. By comparing the data values specified in both the source and target schemas, similarity between the data values, in particular "equality" or "containment," may be detected. The comparisons may determine, for example, that the values stem from the same sample data record.

For example, "Mr." is the instance value for the salutation field 506 in the sample source instance record 502, as well as the title field 508 in the sample target structure 504. If these fields are the only fields containing "Mr.", then it may be assumed that these two fields are related by equality. In another example, because the FirstName field 510 contains the instance value "Allan" and the only field in the sample target structure 504 containing "Allan" is First Name field 512 (e.g., containing "Allan Humph"), the two fields are related by string containment.

While equality is used to determine the simple COPY function, string containment may be used to identify the complex functions CONCATENATE and EXTRACT, as described in more detail in the following operations.

In operation ①, a search for string containment occurs. This may be done by a string search function over the instance values of the source and schema elements. The goal is to find all source elements whose instance values exist as a substring of a target element. For example, referring to FIG. 6, the search returns that the source elements FirstName, MiddleName, Type, and Spec have sample instance values that are substrings of the sample instance value of the target element FirstName.

In operation ②, CONCATENATE functions and parameters are identified. In this operation, a combination of source instance values, in particular Allan and Humpf, needs to be identified, whose concatenations would return the full string Allan Humpf. The full string may contain special characters, such as space, dot, quotes, etc., which are not included in the substrings but serve as delimiters. In the current example, the space in "Allen Humpf" is such a character. Therefore, first all special characters may be deleted from the substrings and the full string as shown in FIG. 7. Furthermore, all letters may be converted to lower case in order to be case-independent.

Next, a succession graph is built from the source sample instance values according to their succession in the full string. As described above with reference to FIG. 1, the succession graph 116 may contain the various nodes. For example, nodes for "Humpf" and "Hum" are child nodes of the node for "Allan" in the succession graph 116 because the strings "Humpf" and "Hum" immediately follow the string "Allan" in the full string AllanHumpf. On the other side, the node for "All" does not have any successors and represents an unconnected node in the graph.

After construction of the succession graph 116, all paths from root nodes to leave nodes are identified, namely paths such as {Allan, Hum}, {Allan, Humpf}, and {All}, which indicate all possible combinations of the substrings according to their succession within the full string. The combination {Allan, Humpf} of sample instance values of the source schema elements FirstName and MiddleName delivering the full string AllanHumpf is returned. For example, the branch 118 may represent the association between source elements 510 and 512 in the sample source instance record 502 and the corresponding target element 514 in the target structure 504. Such an association may be displayed automatically to the user via the user interface 310. User confirmation of such associations is only necessary if several combinations delivering the same full string are found.

After having identified the combinations of substrings (e.g., {Allan, Humpf}), the system may further identify the delimiters between the substrings, such as within the original sample instance value Allan Humpf of the target element FirstName. Identifying the delimiters may be done by searching for the occurrences of the single substrings in the full string and identifying the delimiting string as the one or more delimiting characters in the full string which are between two succeeding substrings. The system may identify the space character as the delimiter between the values of the FirstName and MiddleName source elements 510 and 512 within the value of the FirstName target element 514. In the case that such characters are not unique in the full string, the system may also count the occurrences of them. Moreover, the system may also identify the absolute start and end position of a substring within the full string. The information, namely the delimiter, its occurrence number and the absolute positions may be used to define the CONCATENATE function.

For example, the system may derive the following conversion function for this example, as shown below in Equation (10):

$$\text{target.FirstName} = \text{CONCATENATE}(\text{source.FirstName}, \text{delimiter}=" ", \text{source.MiddleName}) \quad (10)$$

In operation ③, EXTRACT functions and parameters may be generated. The EXTRACT function is the inverse of the CONCATENATE function, used to EXTRACT substrings out of larger, complete strings, such as pulling a first name from a whole name. In order to generate an EXTRACT function and its necessary parameters, the system may apply the mechanism of operation ② in the reverse direction. Namely, the system may search for those source elements which are a concatenation of target elements. Then, for each target element, the system may generate an EXTRACT function to EXTRACT its value from the corresponding source element.

For example, by applying operation ② in the inverse direction, the system may obtain the result expressed in Equation (11):

$$\text{source.MainAddress} = \text{CONCATENATE}(\text{target.HouseNumber}, \text{delimiter}=",", \text{target.Street}) \quad (11)$$

Then the system may automatically generate the following EXTRACT functions for the target elements HouseNumber and Street as follows in Equations (12) and (13):

$$\text{target.HouseNumber} = \text{EXTRACT}(\text{source.MainAddress}, \text{start}=\text{BOS}, \text{end}=",") \quad (12)$$

$$\text{target.Street} = \text{EXTRACT}(\text{source.MainAddress}, \text{start}=",", \text{end}=\text{EOS}) \quad (13)$$

In preceding functions above, BOS=Beginning of String, and EOS=End of String.

After the completion of operations ② and ③ for all strings requiring concatenation or extraction, the conversion information determined automatically by the system may be displayed to the user. FIG. 8 shows an example mappings validation screen 800 for a conversion. For example, the screen 800 may display the current values of mappings 804 and associated comments 806 for source elements 808 being converted to target elements 810. A user may use the screen 800 (e.g., part of the user interface 310), for example, to manually examine and confirm the conversion functions. The screen 800 may also allow the user to remove incorrect matches, add new matches, or enhance the existing matches.

The screen 800 may identify how elements are to be handled during the conversion process. For source elements 808 that may simply be copied to target elements 810 during the conversion process, the mapping 804 may display "MOVE." For cases when concatenation is required, the mapping 804 may display "CONCAT" such as the concatenation mapping 812 for the source elements @FirstName and @MiddleName source elements 814. The delimiters 816 to be used for the mapping may be listed in the comments 806. For cases when extraction is required, the mapping 804 may display "EXTRACT" such as the extraction mapping 818 for the source element @ContactAddress:Addr1 source element 820. The delimiters 816 to be used for the mapping may be listed in the comments 806.

The screen 800 may include various controls for allowing to user to process the mappings 804. For example, the controls may include mapping (or field match) controls 828 (e.g., buttons to Add Match, Remove Match, Edit Match and Save Matches). The screen 800 may also include confirmation checkboxes 826 which the user may use to confirm that the current mapping 804 is agreeable to the user. In some implementations, the user may be required to explicitly confirm all mappings before processing to the next operation 830. The screen 800 may include other controls 830, such as a control to hide confirmed matches or to confirm all matches. In some implementations, if the user elects to hide confirmed matches, another control may appear on the screen 802 to unhide the current matches, so as to allow the user to double-check the mappings. In some implementations, an additional control to "Unconfirm All" may be available, allowing the user to uncheck the confirmation checkboxes 826 in one fell swoop.

In some implementations, path name prefixes 828a and 828b may be used to improve readability and/or save space on the display. The prefixes 828a and 828b (e.g., "/QB Customer/ . . . " and "/Contacts/ . . . ") may represent the common path or other name part of the source elements 808 and target elements 810 displayed beneath the prefixes 828a and 828b, respectively. For example, the first source element 808 is displayed as "@AccountNumber", but the entire name of the element is essentially "/QBCustomer/@AccountNumber. Doing so may make the names of elements easier for the user to comprehend and manage. In some implementations, the entire element name may be displayed in some or all cases.

In operation ④, having confirmed the mappings, the conversion functions may be executed to transform or convert the data. Specifically, by now, the complex conversion functions, like CONCATENATE and EXTRACT, have been identified with necessary parameters, namely the delimiter for the CONCATENATE function, and the start and end delimiters for the EXTRACT function. They are executable to transform data from the source schema to the target schema. Thus, the functions may be applied on single data records in the source schema in order to obtain a corresponding record of transformed data in the target schema. By executing the conversion functions, the system may obtain the transformed data record in the target schema as shown in the example in FIG. 9.

Figure 9:
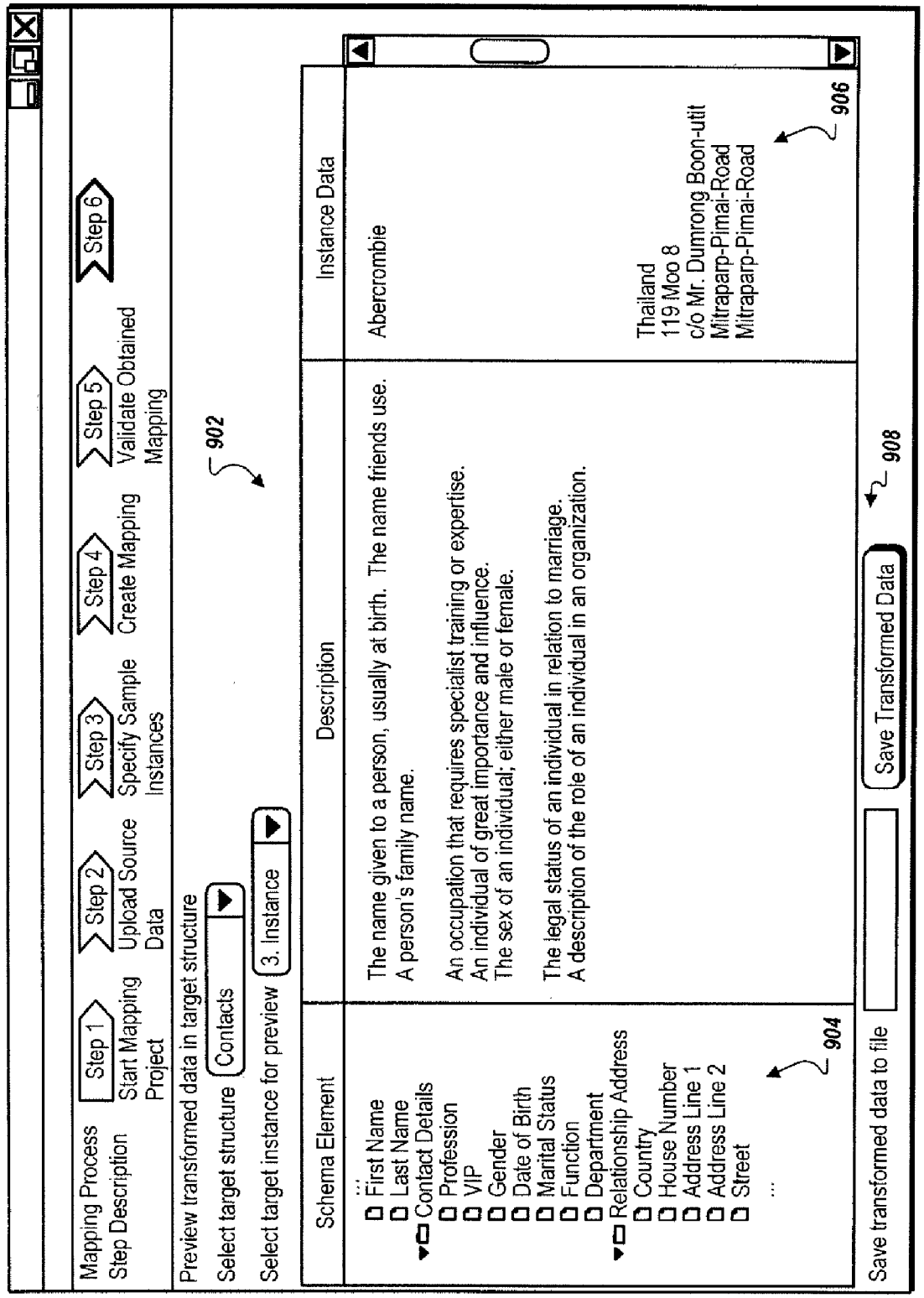

FIG. 9 shows an example transformed record 902. The display of the record 902 may include a schema element column 904 that lists the names of the fields, a description column 906 that describes the data in the field, and an instance data column 908 that lists the field's value. The user may use the display of the record 902 to verify that the conversion completed satisfactorily. If the user decides that transformed data is acceptable, the user may employ various controls 910, such as a button for saving the transformed data and a field for entering the name of the file to contain the transformed data. Other controls not displayed in FIG. 9 may exist, such as the option to make corrections to the functions used in the conversion process or to correct or modify the data as needed.

FIGS. 10-16 show an example sequence of application screens that may be used to define and execute conversion functions. The screens may be displayed, for example, on the user interface 310, allowing the user to employ the data migration tool 306 to prepare for and execute the conversion of data from the source data storage system 312 to the target data storage system 314.

Figure 10:
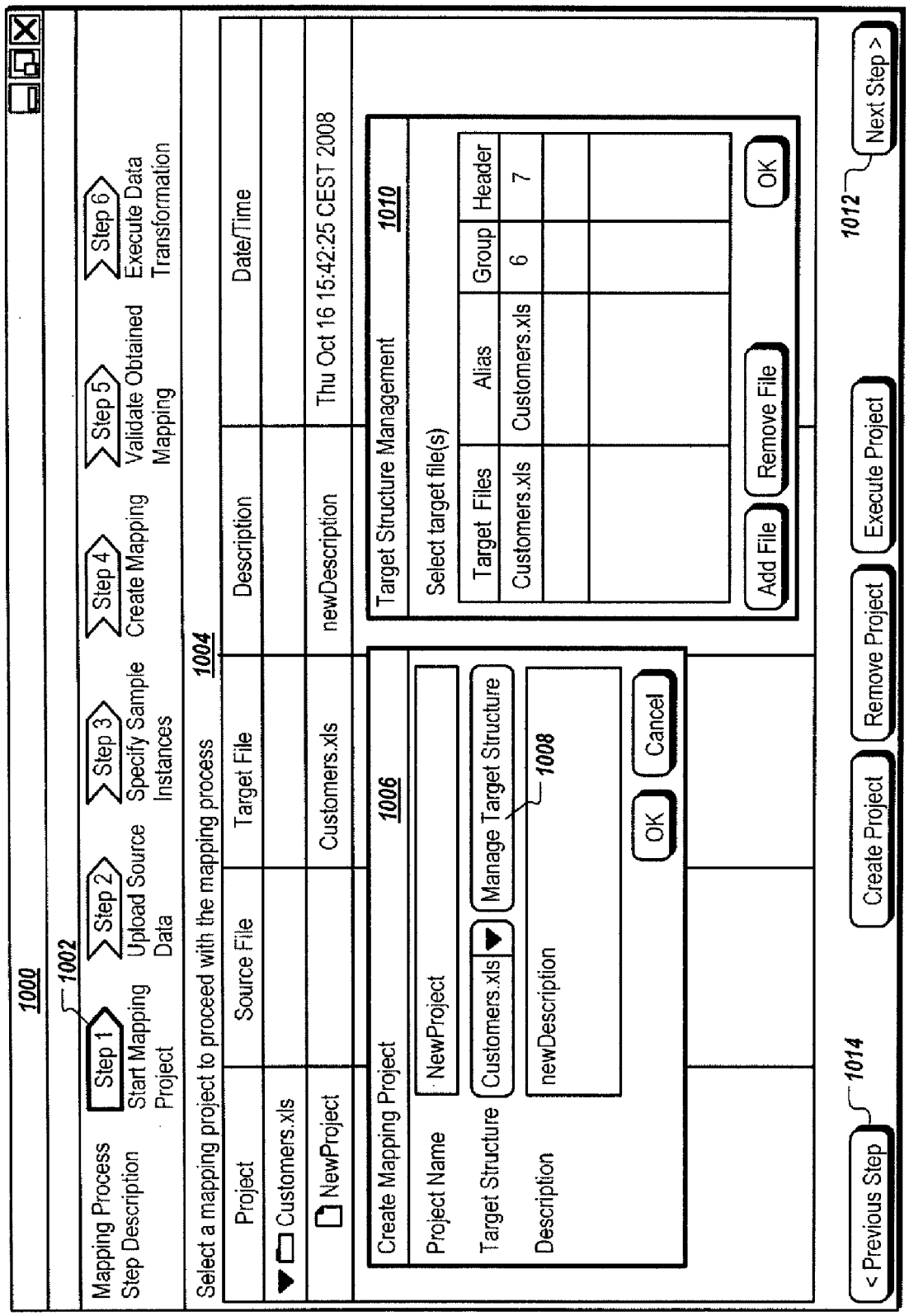

FIG. 10 shows an example first screen 1000 in which the user may start the mapping process 1002 in operation ①. The screen 1000 may include a projects area 1004, listing the conversion projects that are currently defined. The screen 1000 may include, for example, a project definition area 1006 for entering the project name, target structure name, and a description of the project. Upon selecting a control 1008, a target structure management area 1010 may be displayed which the user may employ to select target files for the conversion. Once the information on the screen 1000 is complete, the user may advance to the next screen, such as by selecting a control 1012. In general, a control such as control 1012 may appear on any of the screens, and a back control 1014 may be used to return to previous screens and operations in the process.

FIG. 11 shows an example screen 1100 in which the user may upload source data 1102 in operation ②. The screen 1100 may include a schema elements area 1104 for displaying the elements in the source schema, and an instance data area 1106 for displaying the values of the elements.

Figure 12:
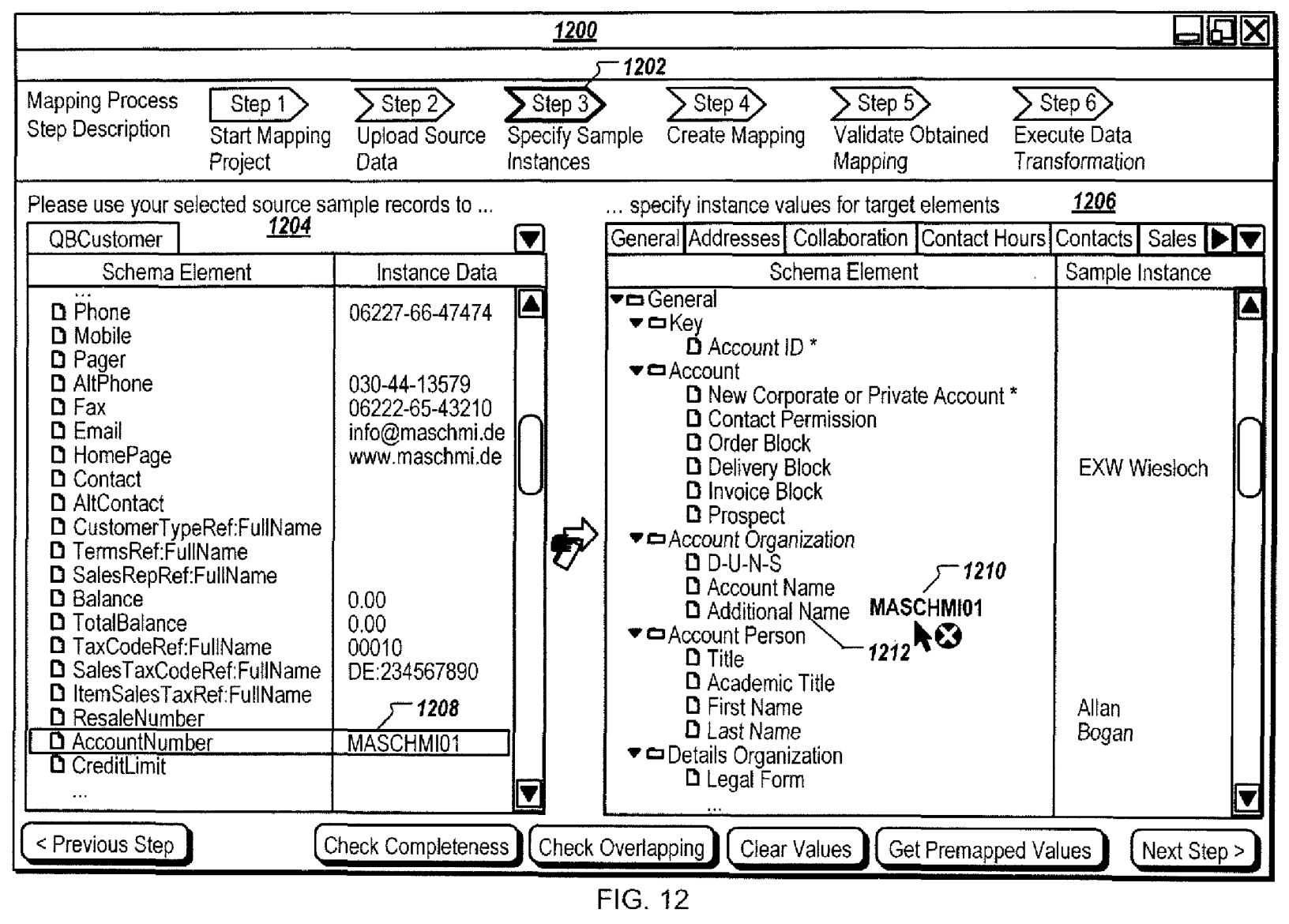

FIG. 12 shows an example screen 1200 in which the user may specify sample instances 1202 in operation ③. The screen 1200 may include a source sample records selection area 1204 for displaying the source schema elements, and a target element instance data area 1206 for defining and displaying the values of the elements. For example, the user may select a value 1208 (e.g., "MASCHMI01" for the Account-Number schema element) and drag it 1210 over to a corresponding target schema element, such as the Additional Name element 1212, thereby populating the sample data record in the target schema. This manual approach may complement the automatic generation of conversion functions (e.g., CONCAT, EXTRACT, etc.) resulting from computing succession graphs described above.

Figure 13:
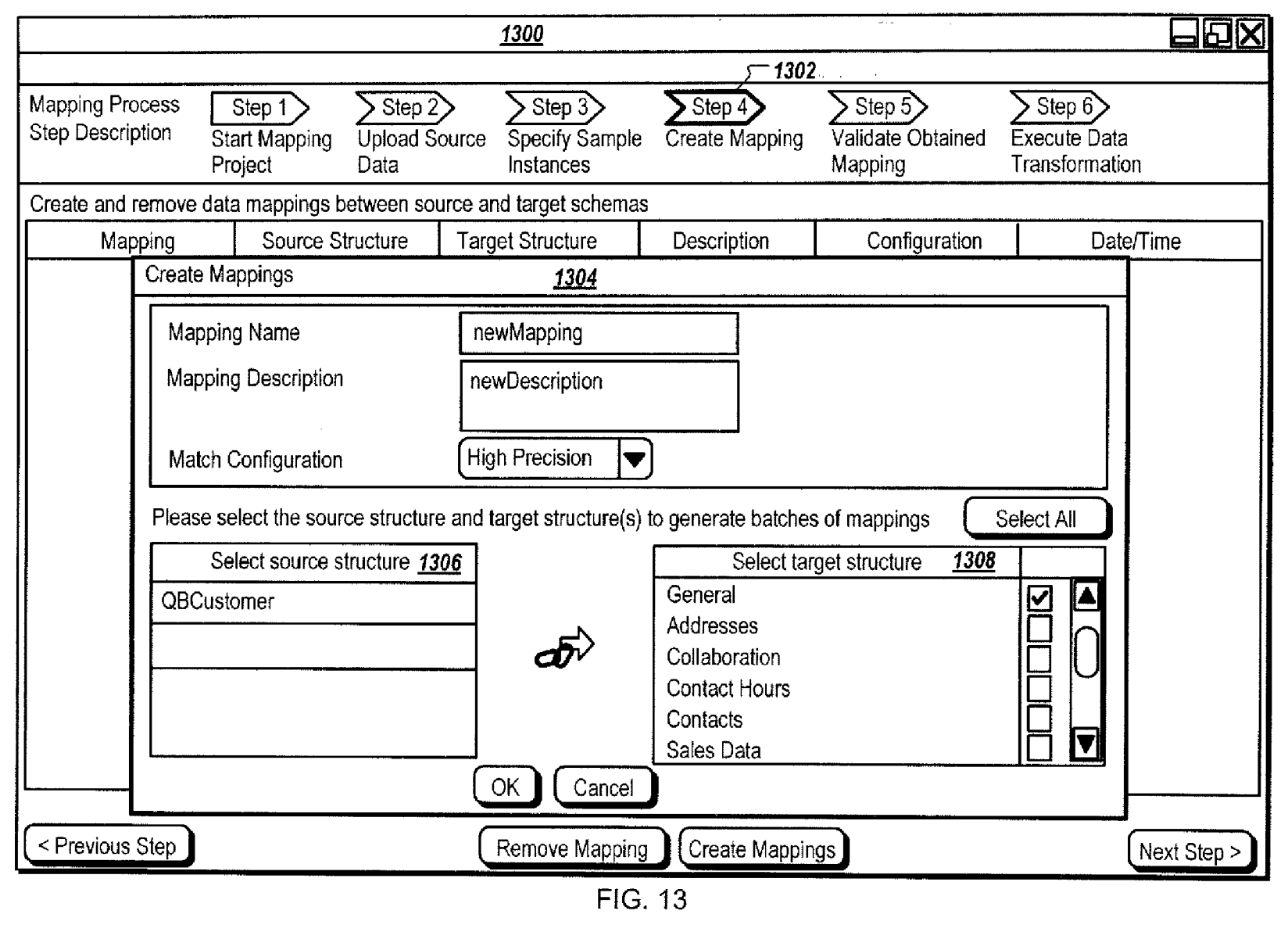

FIG. 13 shows an example screen 1300 in which the user may create mappings 1302 in operation ④. The screen 1300 may include a create mapping definition area 1304 for specifying the mapping name, a description and other fields. The create mapping definition area 1304 may further include a source structure selection area 1306, showing the current user selection of the source structure to use in the conversion, and a select target structure area 1308 for selecting the target of the conversion.

FIG. 14 shows an example screen 1400 in which the user may validate obtained mappings 1402 in operation ⑤. The screen 1400 may be similar to the screen 802 described above with respect to FIG. 8. For example, the screen 1400 may allow the user to confirm current values of mappings 1404 and associated comments 1406 for source elements 1408 being converted to target elements 1410. A user may use the screen 1400, for example, to manually examine and confirm the conversion functions. The screen 1400 may also allow the user to remove incorrect matches, add new matches, or enhance the existing matches.

Figure 15:
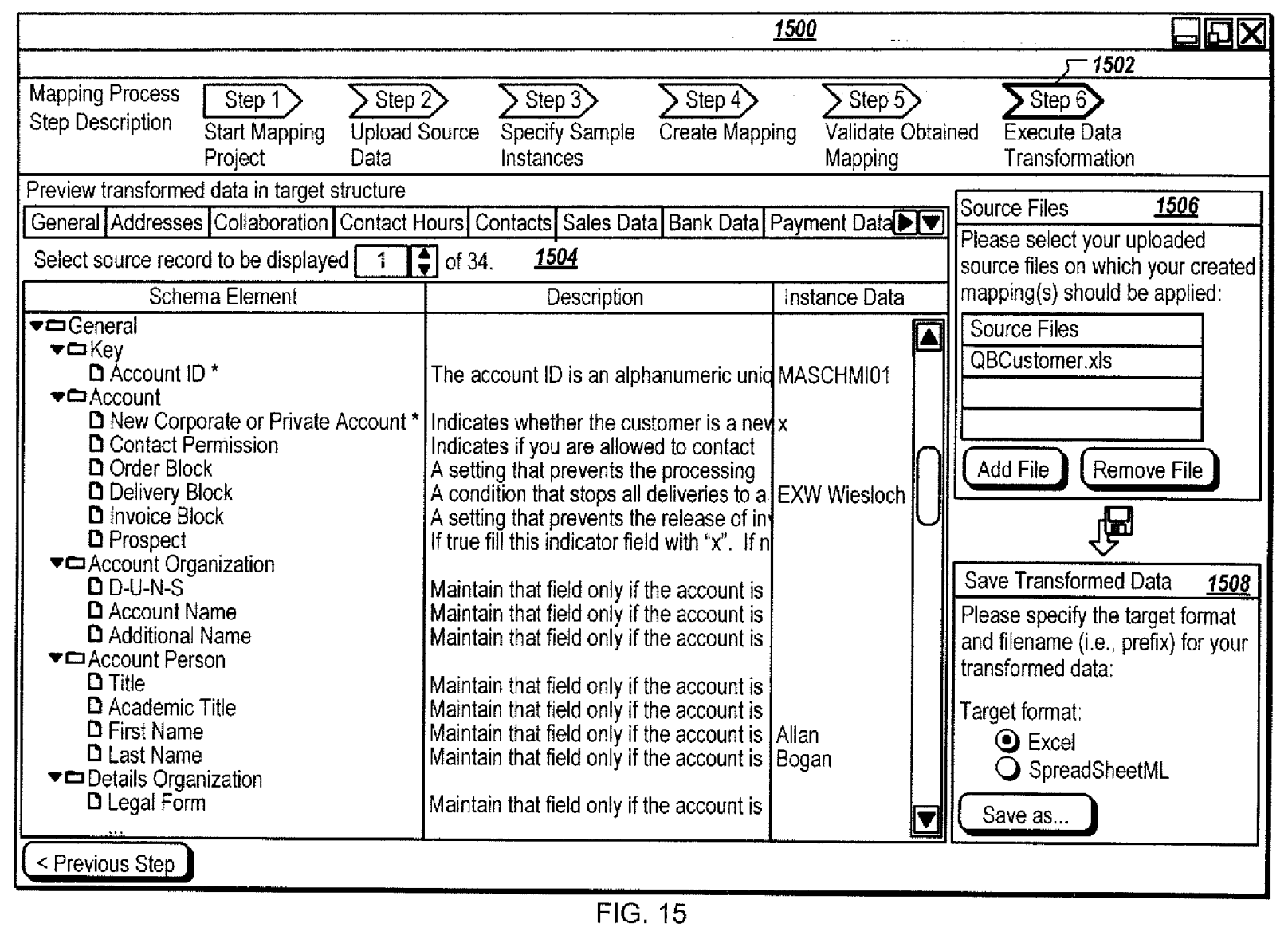

FIG. 15 shows an example screen 1500 in which the user may execute data transformation 1502 in operation ⑥. The screen 1500 may include a source record display area 1504 for displaying source instances and their values, a source file selection area 1506 for specifying the names of the files to be converted, and a save transformed data are 1508 for specifying the target format (e.g., Excel, spreadsheet, etc.) of the converted data.

Upon completion of the execution data transformation operation 1502, the user may repeat some of the operations described in reference to FIGS. 10-15 for other conversion needs. For example, as shown in FIG. 16, the user may return to the screen 1200 in which the user may specify additional sample instances 1202, using elements from the source sample records selection area 1204 to define instances in the target element instance data area 1206.

FIG. 17 is a comparison chart 1702 comparing example values for different cardinalities used for mapping strings and substrings for conversion. For example, the values in the chart 1702 include source elements and instances 1704, target elements and instances 1706, and mapping functions and delimiters 1708. The rows in the chart 1702 compare values for different cardinalities 1710.

For example, a 1:1 cardinality 1712 identifies the case where a simple copy function 1714 may be used. A 1:1 cardinality 1716 identifies the case where a simple copy function 1718 may be used, but the value to be copied is surrounded by blanks. An N:1 cardinality 1720 identifies the case where a CONCATENATE function 1722 may be used. A 1:N cardinality 1724 identifies the case where an EXTRACT function 1726 may be used. Finally, an N:M cardinality 1728 identifies the case where a combination of EXTRACT and CONCATENATE functions 1730 may be used.

Figure 18:
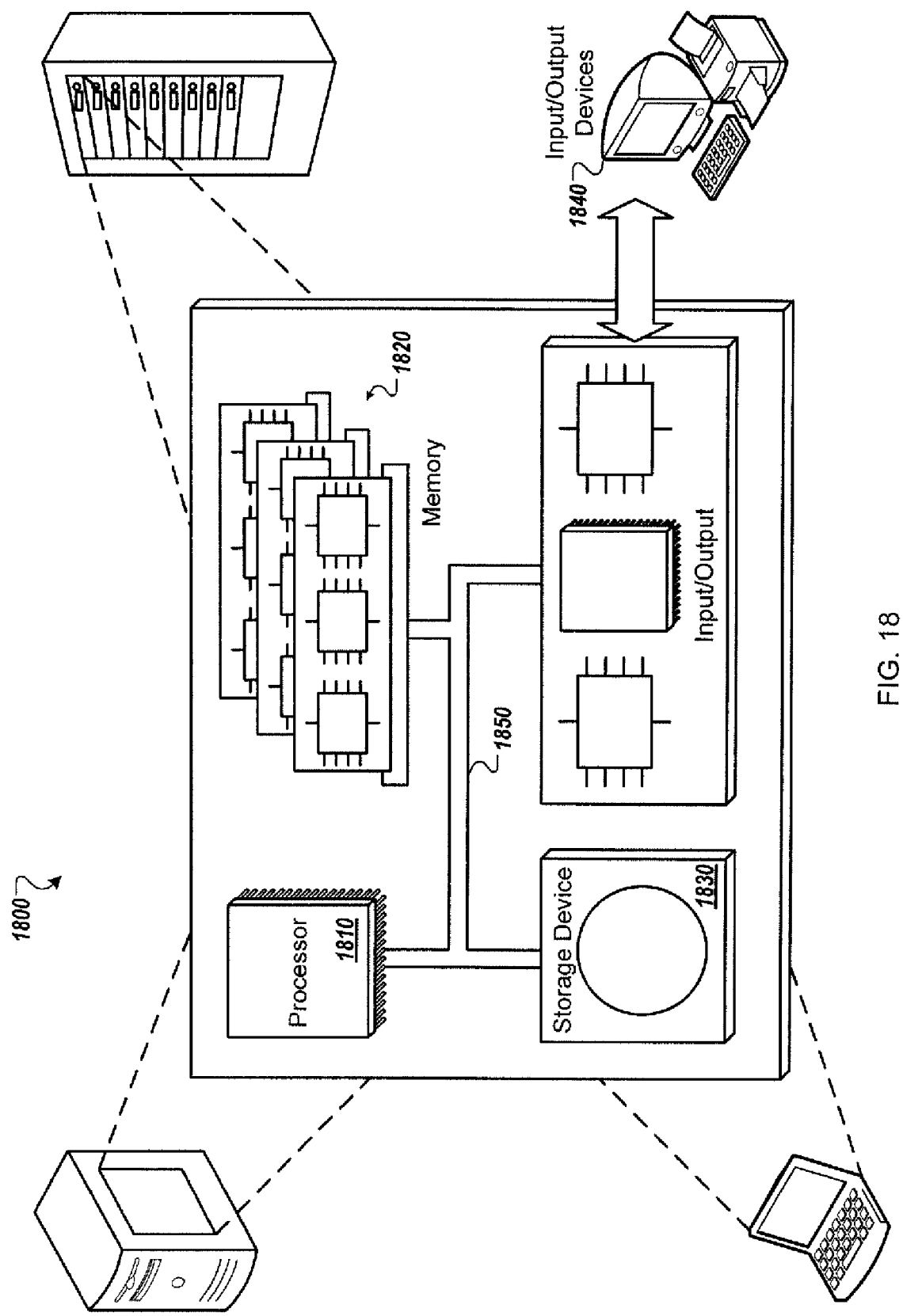
FIG. 18 is a block diagram illustrating the internal architecture of a computer.

FIG. 18 is a schematic diagram of an example of a generic computer system 1800. The system 1800 may be used for the operations described in association with the method 400 according to one implementation. For example, the system 1800 may be included in the client device 300.

The system 1800 includes a processor 1810, a memory 1820, a storage device 1830, and an input/output device 1840. Each of the components 1810, 1820, 1830, and 1840 are interconnected using a system bus 1850. The processor 1810 is capable of processing instructions for execution within the system 1800. In one implementation, the processor 1810 is a single-threaded processor. In another implementation, the processor 1810 is a multi-threaded processor. The processor 1810 is capable of processing instructions stored in the memory 1820 or on the storage device 1830 to display graphical information for a user interface on the input/output device 1840.

The memory 1820 stores information within the system 1800. In one implementation, the memory 1820 is a computer-readable medium. In one implementation, the memory 1820 is a volatile memory unit. In another implementation, the memory 1820 is a non-volatile memory unit.

The storage device 1830 is capable of providing mass storage for the system 1800. In one implementation, the storage device 1830 is a computer-readable medium. In various different implementations, the storage device 1830 may be a floppy disk device, a hard disk device, an optical disk device, or a tape device.

The input/output device 1840 provides input/output operations for the system 1800. In one implementation, the input/output device 1840 includes a keyboard and/or pointing device. In another implementation, the input/output device 1840 includes a display unit for displaying graphical user interfaces.

The features described may be implemented in digital electronic circuitry, or in computer hardware, firmware, software, or in combinations of them. The apparatus may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the client A 102 and the server 104 may be implemented within the same computer system.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
populating a first data record in a first data source and a second data record in a second data source with manually selected, representative sample data, the first and second data sources using respective first and second data storage schemas to store the representative sample data as instance values of instance elements;
selecting a first instance value of the first data record;
selecting instance elements of the second data record whose associated instance values form a substring of the first instance value;
generating one or more succession graphs using the instance elements, wherein each of the one or more succession graphs comprises:
nodes representing the associated instance values of the second data record, and
one or more lines connecting at least two nodes, each of the one or more lines indicating a succession relationship between the associated instance values represented by the at least two nodes and the first instance value of the first data record;
selecting a succession graph from the one or more succession graphs whose combined instance values, when traced from a root node to a leaf node, provide the first instance value;

automatically determining parameters for a CONCATENATE function or an EXTRACT function based on the succession graph;

storing the CONCATENATE function or the EXTRACT function; and converting non-sample data between the first and second data storage schemas of the respective first and second data sources, by executing the CONCATENATE function or the EXTRACT function, the CONCATENATE function, when executed, combining a plurality of instance values from the first data storage schema to provide an instance value in the second data storage schema, and the EXTRACT function, when executed, parsing an instance value from the first data storage schema to provide a plurality of instance values in the second data storage schema.

2. The computer-implemented method of claim 1, wherein the first and second data sources represent source and target data sources, respectively.

3. The computer-implemented method of claim 1, wherein the first and second data sources represent target and source data source, respectively.

4. The computer-implemented method of claim 1, wherein populating the first and second data records further comprises:

selecting a sample first data record of the first data source to supply the representative sample data; and manually populating the second data record with data specified by the sample first data record.

5. The computer-implemented method of claim 1, further comprising converting a case of the first instance value.

6. The computer-implemented method of claim 1, comprising:

identifying, as a parameter of the CONCATENATE function, a delimiting string of the first instance value.

7. The computer-implemented method of claim 6, further comprising removing the delimiting string from the first instance value.

8. The computer-implemented method of claim 6, wherein the delimiting string further comprises a combination of one or more of a space, a dot, a dash, an underscore, a comma, a semicolon, a colon, or a quotation mark.

9. The computer-implemented method of claim 1, further comprising:

processing a manual selection of the succession graph whose combined instance values provide the first instance value, when more than one succession graph exhibits combined instance values that provide the first instance value.

10. The computer-implemented method of claim 1, wherein the CONCATENATE function is expressed as:

FirstDataSource.InstanceElement=CONCATENATE(SecondDataSource.FirstInstanceElement, DelimitingString, SecondDataSource.SecondInstanceElement), wherein:

FirstDataSource.InstanceElement represents the first instance value,

SecondDataSource.FirstInstanceElement represents an instance value of the root node of the succession graph, DelimitingString represents a delimiting string associated with the first instance value, and SecondDataSource.SecondInstanceElement represents an instance value of the leaf node of the succession graph.

11. The computer-implemented method of claim 1, wherein the EXTRACT function is expressed as:

SecondDataSource.FirstInstanceElement=EXTRACT(FirstDataSource.InstanceElement, START=BeginningOfString, END=DelimitingString), SecondDataSource.SecondInstanceElement=EXTRACT(FirstDataSource.InstanceElement, START=DelimitingString, END=EndOfString), wherein:

FirstDataSource.InstanceElement represents the first instance value,

SecondDataSource.FirstInstanceElement represents an instance value of the root node of the succession graph, FirstOrSecondDataSource.InstanceElement represents the instance value either the first or second data record, DelimitingString represents a delimiting string associated with the first instance value, SecondDataSource.SecondInstanceElement represents an instance value of the leaf node of the succession graph, BeginningOfString represents a beginning of the string defined by the first instance value, EndOfString represents an end of the string defined by the first instance value, and AbsolutePosition represents an absolute position, from the beginning of string to the end of string, in the string defined by the first instance value.

12. The computer-implemented method of claim 1, further comprising:

outputting the parameters of the CONCATENATE function or the parameters of the EXTRACT function, and receiving a user input confirming that the parameters are correct.

13. The computer-implemented method of claim 1, wherein:

a first data storage schema of the first data source stores first and last name representative sample data as a single instance element; and a second data storage schema of the second data source stores the first and last name representative sample data as a first name instance element and a different, second name instance element.

14. The computer-implemented method of claim 1, wherein:

the first data storage schema stores street number and street name representative sample data as a single instance element; and the second data storage schema stores the street number and street name representative sample data as a street number instance element and a different, street name instance element.

15. The computer-implemented method of claim 1, wherein:

automatically determining the parameters for a CONCATENATE function or an EXTRACT function based on the succession graph comprises automatically determining parameters for a CONCATENATE function and parameters for an EXTRACT function; and converting the non-sample data between the first and second data storage schemas, using the CONCATENATE function or the EXTRACT function further comprises executing the CONCATENATE function and the EXTRACT function.

16. A system comprising:

one or more computers; and a computer-readable medium coupled to the one or more computers having instructions stored thereon which, when executed by the one or more computers, cause the one or more computers to perform operations comprising:

populating a first data record in a first data source and a second data record in a second data source with manually selected, representative sample data, the first and second data sources using respective first and second data storage schemas to store the representative sample data as instance values of instance elements;

selecting a first instance value of the first data record;

selecting instance elements of the second data record whose associated instance values form a substring of the first instance value;

generating one or more succession graphs using the instance elements, wherein each of the one or more succession graphs comprises:

nodes representing the associated instance values of the second data record, and one or more lines connecting at least two nodes, each of the one or more lines indicating a succession relationship between the associated instance values represented by the at least two nodes and the first instance value of the first data record;

selecting a succession graph from the one or more succession graphs whose combined instance values, when traced from a root node to a leaf node, provide the first instance value;

automatically determining parameters for a CONCATENATE function or an EXTRACT function based on the succession graph;

storing the CONCATENATE function or the EXTRACT function; and converting non-sample data between the first and second data storage schemas of the respective first and second data sources, by executing the CONCATENATE function or the EXTRACT function, the CONCATENATE function, when executed, combining a plurality of instance values from the first data storage schema to provide an instance value in the second data storage schema, and the EXTRACT function, when executed, parsing an instance value from the first data storage schema to provide a plurality of instance values in the second data storage schema.

17. A non-transitory computer-readable storage medium coupled to one or more processors and having instructions stored thereon which, when executed by the one or more processors, cause the one or more processors perform operations comprising:

populating a first data record in a first data source and a second data record in a second data source with manually selected, representative sample data, the first and second data sources using respective first and second data storage schemas to store the representative sample data as instance values of instance elements;

selecting a first instance value of the first data record;

selecting instance elements of the second data record whose associated instance values form a substring of the first instance value;

generating one or more succession graphs using the instance elements, wherein each of the one or more succession graphs comprises:

nodes representing the associated instance values of the second data record, and one or more lines connecting at least two nodes, each of the one or more lines indicating a succession relationship between the associated instance values represented by the at least two nodes and the first instance value of the first data record;

selecting a succession graph from the one or more succession graphs whose combined instance values, when traced from a root node to a leaf node, provide the first instance value;

automatically determining parameters for a CONCATENATE function or an EXTRACT function based on the succession graph;

storing the CONCATENATE function or the EXTRACT function; and converting non-sample data between the first and second data storage schemas of the respective first and second data sources, by executing the CONCATENATE function or the EXTRACT function, the CONCATENATE function, when executed, combining a plurality of instance values from the first data storage schema to provide an instance value in the second data storage schema, and the EXTRACT function, when executed, parsing an instance value from the first data storage schema to provide a plurality of instance values in the second data storage schema.

18. The non-transitory computer-readable storage medium of claim 17, wherein the first and second data sources represent source and target data sources, collectively.

* * * * *